US012646108B2

(12) United States Patent
Mettler et al.

(10) Patent No.: US 12,646,108 B2
(45) Date of Patent: *Jun. 2, 2026

(54) IMAGE-BASED FINANCIAL PROCESSING

(71) Applicant: PayPal, Inc., San Jose, CA (US)

(72) Inventors: Michael Mettler, San Francisco, CA (US); Josh Bleecher Snyder, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,860

(22) Filed: Dec. 11, 2023

(65) Prior Publication Data

US 2024/0221071 A1     Jul. 4, 2024

Related U.S. Application Data

(63) Continuation of application No. 16/559,527, filed on Sep. 3, 2019, now Pat. No. 11,875,397, which is a continuation of application No. 13/101,067, filed on May 4, 2011, now Pat. No. 10,402,898.

(51) Int. Cl.
| | |
|---|---|
| *G06Q 40/02* | (2023.01) |
| *G06Q 20/04* | (2012.01) |
| *G06Q 20/32* | (2012.01) |

(52) U.S. Cl.
CPC ......... *G06Q 40/02* (2013.01); *G06Q 20/0425* (2013.01); *G06Q 20/3276* (2013.01)

(58) Field of Classification Search
CPC .................................................... G06Q 40/02
See application file for complete search history.

(56) References Cited

U.S. PATENT DOCUMENTS

| | | | |
|---|---|---|---|
| 6,873,715 | B2 | 3/2005 | Kuo et al. |
| 6,944,648 | B2 | 9/2005 | Cochran et al. |
| 7,118,032 | B2 | 10/2006 | Elliot et al. |
| 7,143,942 | B2 | 12/2006 | Yamanaka et al. |
| 7,353,990 | B2 | 4/2008 | Elliot et al. |
| 7,565,139 | B2 | 7/2009 | Neven, Sr. et al. |

(Continued)

FOREIGN PATENT DOCUMENTS

| | | |
|---|---|---|
| CN | 1790407 A | 6/2006 |
| JP | 000H09231446 | 9/1997 |

(Continued)

OTHER PUBLICATIONS

European Appl. No. 12779562.3, Extended European Search Report mailed Jan. 27, 2015, 6 pages.

(Continued)

*Primary Examiner* — Ojo O Oyebisi
(74) *Attorney, Agent, or Firm* — Haynes and Boone, LLP

(57) ABSTRACT

Image-based processing of sources of financial information for financial transactions is provided. A device is enabled to acquire one or more images including a representation of a source of financial information. The device can validate the source, independent of the financial information in a preliminary analysis. If the source is validated, one or more images are used to acquire the financial information. The financial information is then validated. If the financial information is valid, authorization of the financial transaction can be initiated.

20 Claims, 8 Drawing Sheets

(56)                References Cited

U.S. PATENT DOCUMENTS

| | | | |
|---|---|---|---|
| 7,812,860 | B2 | 10/2010 | King et al. |
| 8,949,708 | B2 | 2/2015 | Peterson et al. |
| 8,959,033 | B1 | 2/2015 | Oakes et al. |
| 9,269,010 | B2 | 2/2016 | Abulafia et al. |
| 2001/0043717 | A1 | 11/2001 | Laumeyer et al. |
| 2005/0071283 | A1* | 3/2005 | Randle .................. G06Q 20/12 |
| | | | 705/75 |
| 2005/0080717 | A1 | 4/2005 | Belyi et al. |
| 2005/0087598 | A1 | 4/2005 | Yamanaka et al. |
| 2005/0125360 | A1 | 6/2005 | Tidwell et al. |
| 2005/0129281 | A1 | 6/2005 | Ashizaki et al. |
| 2005/0129282 | A1 | 6/2005 | O'Doherty et al. |
| 2006/0012677 | A1 | 1/2006 | Neven, Sr. et al. |
| 2006/0041506 | A1 | 2/2006 | Mason et al. |
| 2006/0071081 | A1 | 4/2006 | Wang |
| 2006/0129485 | A1 | 6/2006 | Hamzy et al. |
| 2006/0163345 | A1 | 7/2006 | Myers et al. |
| 2006/0186194 | A1 | 8/2006 | Richardson et al. |
| 2007/0288382 | A1 | 12/2007 | Narayanan et al. |
| 2008/0126415 | A1 | 5/2008 | Chaudhurv et al. |
| 2008/0209313 | A1 | 8/2008 | Gonser |
| 2009/0024912 | A1 | 1/2009 | McCabe et al. |
| 2009/0173784 | A1 | 7/2009 | Yang |
| 2009/0292786 | A1 | 11/2009 | McCabe et al. |
| 2009/0303250 | A1 | 12/2009 | Phillips |
| 2009/0307132 | A1 | 12/2009 | Phillips |
| 2010/0008535 | A1* | 1/2010 | Abulafia ............... G06Q 20/14 |
| | | | 705/30 |
| 2010/0045816 | A1 | 2/2010 | Rhoads |
| 2010/0078471 | A1 | 4/2010 | Lin et al. |
| 2010/0078472 | A1 | 4/2010 | Lin et al. |
| 2010/0082481 | A1 | 4/2010 | Lin et al. |
| 2010/0082485 | A1 | 4/2010 | Lin et al. |
| 2010/0097180 | A1 | 4/2010 | Cardullo |
| 2011/0091092 | A1 | 4/2011 | Nepomniachtchi et al. |
| 2011/0093777 | A1 | 4/2011 | Dunn et al. |
| 2011/0093807 | A1 | 4/2011 | Dunn et al. |
| 2011/0276875 | A1 | 11/2011 | McCabe et al. |
| 2012/0190405 | A1 | 7/2012 | Kumaran |

FOREIGN PATENT DOCUMENTS

| | | |
|---|---|---|
| JP | 2001-266035 | 9/2001 |
| JP | 2001266035 A | 9/2001 |
| JP | 002005216226 | 8/2005 |

OTHER PUBLICATIONS

International Appl. No. PCT/US2012/036561, International Search Report and Written Opinion mailed Jul. 16, 2012, 7 pages.

Sherr, Ian, "App Watch: Signing Documents on the iPad", Jan. 31, 2011, The Wall Street Journal, 2 pages, <http://blogs.wsj.com/digits/2011 /01 /31 /appwatchsigningdocumentsontheipad/>.

Sal Ton, Jeff, "Autograph for iPhone applets you sign on the dotted screen", Jan. 28, 2010, New Atlas, 2 pages, <http://newatlas.com/iphonesignatureappelectronicdocuments/14004/>.

Asad, M, "Sign Your Documents Using iPhone", Nov. 22, 2009, Redmond Pie, 2 pages, <http://www.redmondpie.com/signyour-documents-using-iphone-9140129/>.

Burke, Pariah S., "Sign electronic documents with your own hand-written signature", Aug. 13, 2009, Macworld, 3 pages, <http://www.macworld.com/article/1142183/creative/digitalsigcreate.html>.

Guihua, Zhang, "Sequential Loop Image Processing Technology Research and Application", Master's Degree Thesis, computer software and theory, Apr. 2009, 56 pages, Chongqing University, Shapingba Qu, Chongqing Shi, China.

* cited by examiner access first/next image
402 identifiable card edges?
404
no yes correct image skew/
interpolate card edges
406 card edges match
aspect ratio?
408
no yes yes
identifiable
processor logo?
410 no yes
identifiable
provider logo?
412 no yes
identifiable
background image?
414
no valid card image
416

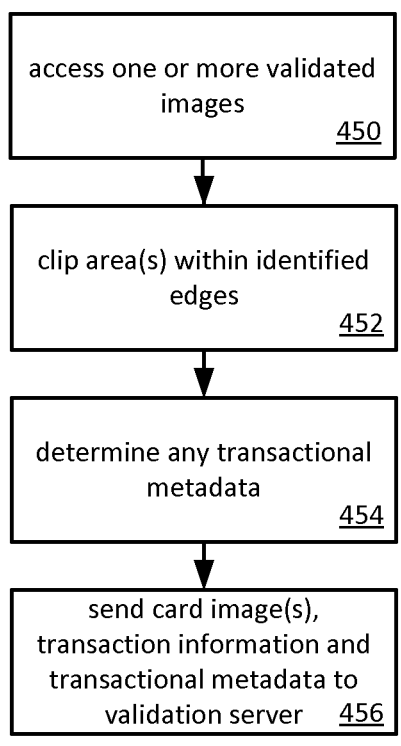

access one or more validated images
450 clip area(s) within identified edges
452 determine any transactional metadata
454 send card image(s), transaction information and transactional metadata to validation server     456

*FIG. 8*

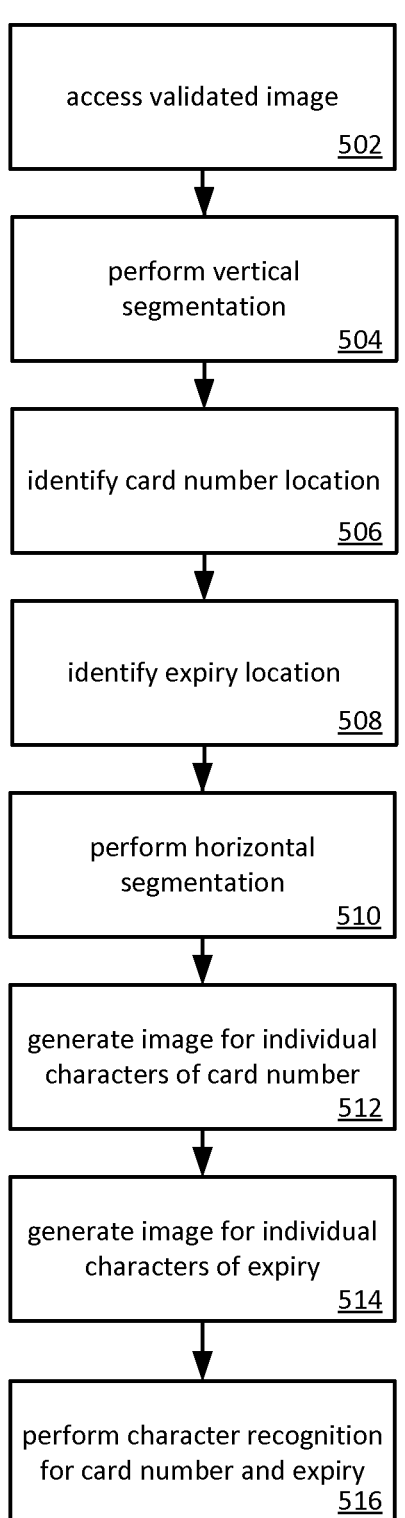

access validated image
502 perform vertical segmentation
504 identify card number location
506 identify expiry location
508 perform horizontal segmentation
510 generate image for individual characters of card number
512 generate image for individual characters of expiry
514 perform character recognition for card number and expiry
516

*FIG. 9* initiate transaction at client device — 602 use pre-acquired source? — 604 no step 204 FIG. 2 — 618 yes receive source selection — 606 access camera and receive image(s) — 608 process images for valid source representation — 610 acquire and validate financial information — 612 validated info match source info? — 614 no yes initiate transaction request — 616

IMAGE-BASED FINANCIAL PROCESSING

CROSS-REFERENCE TO RELATED APPLICATIONS

This application is a continuation of U.S. patent application Ser. No. 16/559,527, filed Sep. 3, 2019, which is a U.S. patent application Ser. No. 13/101,067, filed May 4, 2011, now U.S. Pat. No. 13,101,067, which are incorporated herein by reference in their entirety.

BACKGROUND

Embodiments in accordance with the present disclosure relate to processing financial transactions in computer networks, and more particularly to processing physical sources of financial information for financial transactions.

Physically source-based financial information, such as that found on credit cards, debit cards, etc., is commonly used in financial transactions. These transactions include transactions at retail establishments using dedicated machines to read a magnetic strip on sources containing financial information as well as transactions at online or network-enabled entities, which typically provide a web or other interface for a user to enter financial information from a source.

Traditional mechanisms to capture the financial information indicated by a physical source are not always adequate, nor do they always provide a suitable user experience. An entity without a dedicated machine to read sources of financial information may have no option to initiate or receive a source-based transaction. While online retailers may be able to handle source-based transactions, they typically require a user to manually enter the financial information such as by typing in a web interface.

SUMMARY OF THE INVENTION

Embodiments of the present disclosure are directed to image-based processing of sources of financial information for financial transactions. A computing device is enabled to acquire one or more images including a representation of a source of financial information. The computing device can validate the source, independent of the actual financial information in a preliminary analysis. If the source is validated, one or more images are used to acquire the financial information from the source. The financial information is then validated. If the financial information is valid, a request can be issued to one or more processors for the source. Acquisition and validation of the source of the financial information can be performed by a client device and/or a validation server. Likewise, acquisition and validation of the financial information from the source can be performed by the client device and/or the validation server. For example, the client device may validate the source, then issue a request to the validation server to acquire and validate the financial information. The validation server may respond to the client device with the financial information, issue a request to a processor for authorization of the transaction or send the information to the client device. Image-based processing to authenticate pre-acquired information is also provided.

According to one embodiment, a method of image-based processing includes receiving a plurality of images at a first computing device that include at least a partial representation of a source of financial information associated with a first transaction. For each image, it is determined from the at least partial representation whether the source meets at least one requirement indicating validity. If the source meets the at least one requirement, at least one image of the source is sent from the first computing device to a second computing device. The financial information is determined from the image(s) of the source at the second computing device. The second computing device also determines whether the financial information is valid in one embodiment. If the financial information is determined to be valid, authorization for the first transaction using the financial information can be initiated, for example by authorizing the first transaction at the second computing device or issuing a request to a source processor. The second computing device may also or alternatively, send the financial information to the client device.

According to another embodiment, a method of image-based processing in financial transactions includes receiving a plurality of images at a first device that include at least a partial representation of a source of financial information that is associated with a first transaction. From the at least partial representation of the source in each image, it is determined whether the source meets at least one requirement indicating validity. If the source meets the at least one requirement, financial information is determined based on the representation of the source in each image. In one example, whether the financial information meets at least one requirement indicating validity for the first transaction is also determined. If the financial information is determined to be valid, an authorization request including the financial information for the first transaction is sent.

According to another embodiment, a method of processing financial transactions includes receiving financial information associated with a plurality of sources of financial information, storing the financial information at a client device, initiating a first transaction at the client device using a first source of the plurality, receiving a first image of the first source at the client device in response to initiating the first transaction, and authenticating the financial information using the first image of the first source.

Corresponding methods, systems and computer- or processor-readable storage devices which include a storage media encoded with instructions which, when executed, perform the methods provided herein, may be provided. Other features, aspects, and objects of the disclosed technology can be obtained from a review of the specification, the figures, and the claims.

BRIEF DESCRIPTION OF THE DRAWINGS

FIG. 8 is a flowchart describing a method of sending a request for acquisition and validation of financial information from a source.

FIG. 9 is a flowchart describing a method for determining financial information from one or more validated source images in accordance with one embodiment.

DETAILED DESCRIPTION

Figure 1:
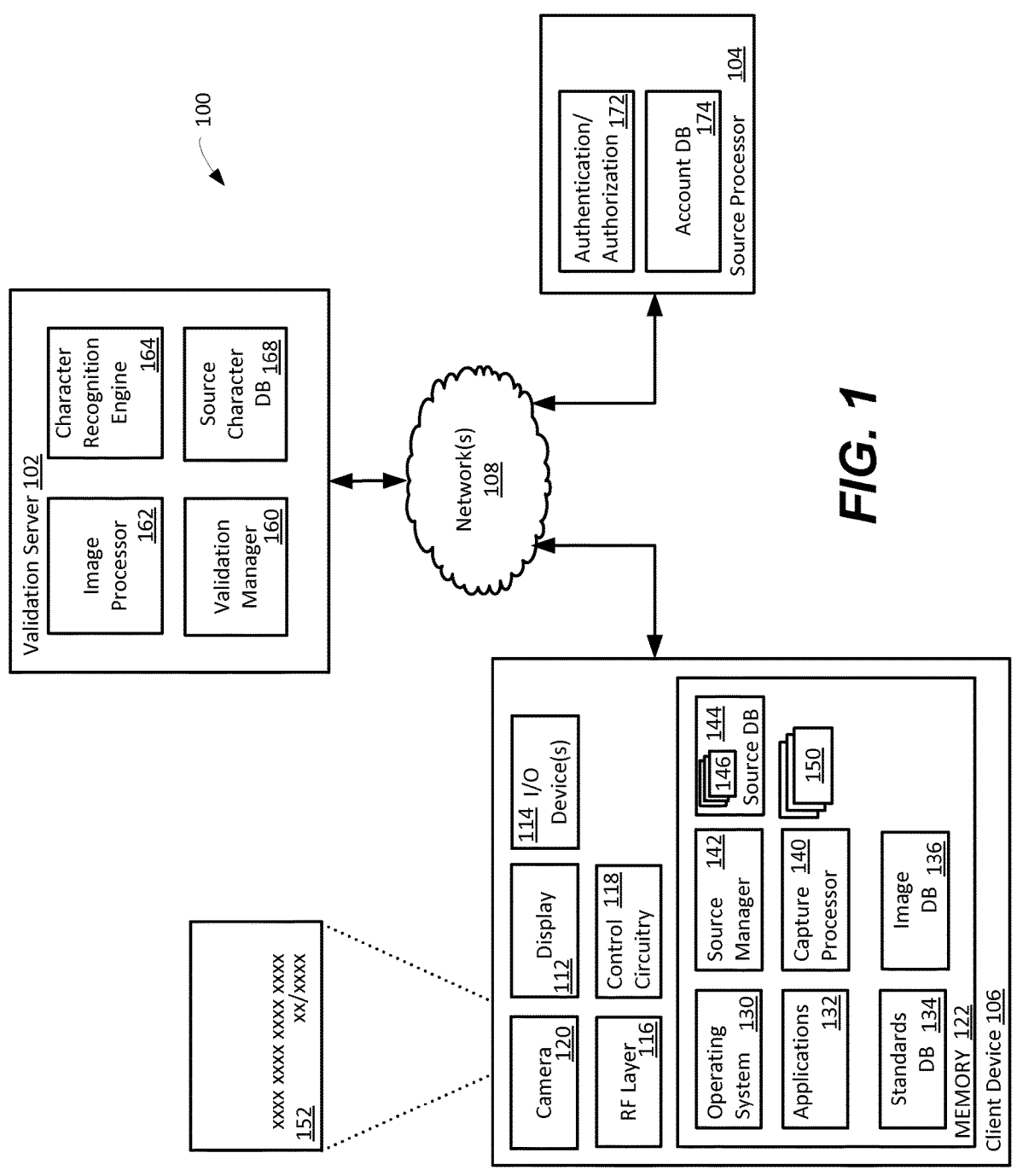
FIG. 1 is a block diagram of a computer network that can be used to implement one or more embodiments of the present disclosure.

In accordance with embodiments of the present disclosure, image-based processing of financial information is provided for financial transactions. In various examples, a client or other device is enabled to acquire a plurality of images including representations of at least a portion of a source of financial information. Processing the images and the financial information represented by the source is distributed in a manner to gain efficiency, accuracy, and validity in the financial information acquisition process.

In one example, a first computing device is enabled to process a set of images and detect a valid source of financial information before invoking additional processing to authenticate the financial information and/or authorize the financial transaction. For example, the device may determine based on the images alone, whether there is a viable source representation of financial information that could be authenticated and authorized. This first set of processing can validate the source of financial information using a set of physical parameters, independent of the content of the financial information indicated by the source. For example, image-based processing may be used to compare the images to pre-defined attributes or characteristics of valid sources of financial information. In this manner, an efficient preliminary validation is preformed on the source itself, before processing the actual financial information. If the source of financial information is not determined to be valid, processing to acquire and analyze the actual financial information can be avoided.

If the source representation is validated in one or more images, further processing to determine the financial information indicated by the source is invoked. In one embodiment, additional processing is invoked at the first computing device to acquire the financial information from the image(s). In another embodiment, additional processing is invoked at a second computing device remote from the first computing device. One or more of the validated images containing a source representation are analyzed, using a second set of processing steps to acquire the financial information indicated by the source in the image(s). The second set of processing steps may determine financial information such as a credit card or account number and/or expiry, for example.

Once the financial information is acquired, an analysis is applied to the information to determine whether it is valid before processing or issuing a transaction request to a processor for the transaction. As with the source analysis, analyzing the financial information may be invoked at the first computing device or at a second computing device. In one example, determining whether the financial information is valid includes determining whether the information can be authenticated and/or authorized, as opposed to actually authenticating and/or authorizing the information itself. The financial information indicated by the source can be validated to avoid unnecessary processing of the financial information or transaction, which might include requests to other parties such as card processors and aggregators. A further layer of efficiency is implemented to avoid transmitting and/or processing information that can't be authenticated or authorized.

If the financial information is validated, a request can be sent to a suitable processor for authentication of the financial information and authorization of the financial transaction. In one embodiment, the request is sent from the first computing device to a card processor. In another embodiment, the request is sent from the second computing device to the card processor.

The first or second computing device receives a response from the card processor indicating that the transaction has been authorized or denied, or that the financial information cannot be authenticated. If the second computing device receives the reply, it can reply to the first computing device. The first computing device can initiate a display to indicate to a user that the transaction was authorized or denied, or that the card could not be authenticated. In one example, the first computing device can provide a display and input/output (I/O) device to receive a signature from the user. The signature may be provided manually, such as by using a touch screen device, or entered in a digital manner as associated with electronic signatures. In this manner, the user of the source of financial information can be authenticated so that a card present transaction can be made. In other embodiments, a signature is not required.

In one embodiment, the first computing device is a client device and the second computing device is a remote validation server as described below.

FIG. 1 is a block diagram of a computer network that can be used to implement one or more embodiments of the present disclosure. System 100 includes a client device 106, a validation server 102 and a source processor 104. Validation server 102, source processor 104 and client device 106 communicate over one or more networks 108. Network(s) 108 may include any combination of public networks, private networks, corporate networks, local area networks (LAN), wide area networks (WAN) and the like. Although principally described with respect to the internet and web-based applications, embodiments in accordance with the present disclosure may be implemented in any type of computer network environment.

In various examples, client device 106, validation server 102 and source processor 104 may be implemented using one or more computing devices as described hereinafter. In one example client device 106 may be a mobile device such as a smart phone, cell phone, personal digital assistant, hand held computer, laptop etc. Client device 106 may also include non-mobile devices such as servers, desktop computers and/or other dedicated computing devices. In FIG. 1, client device 106 includes a display 112 (e.g., liquid crystal display), one or more input/output (I/O) devices 114, radio frequency (RF) layer 116, control circuitry 118, camera 120 and memory 122. The various components of client device 106 may communicate over one or more buses (not shown). Other components such as peripheral device ports, audio and video interfaces and other components not pertinent to the present disclosure are not shown.

I/O devices 114 can include commonly known inputs such as side input elements (e.g., rotary switches), face mounted input elements such as buttons, multi-key keyboards, or other manual input elements. In one example, I/O devices 114 may include display 112, such as where display 112 is a touch screen device capable of receiving manual input as well as providing visual output.

Memory 122 can include various volatile and/or non-volatile memory. Memory 122 can store processor readable code that is executable by one or more processors of control circuitry 118 to implement various functionality described herein. Operating system 130 resides in memory 122 and is executable on or by control circuitry 118. Various applications 132 may be loaded into memory 122 and run on or outside of the operating system 130. Examples of applications 132 include phone dialer programs, e-mail programs, personal information management programs, word processing programs, spreadsheet programs, internet browser programs, games, social networking applications, shopping applications, global positioning system applications and so forth. Applications 132 may use and store information in non-volatile storage such as e-mail or other messages used by an e-mail application, contact information used by a personal information management program, documents used by a word processing application and the like. In one embodiment, applications 132 include a stand-alone application provided by capture processor 140 to initiate a financial transaction using image-capture capabilities.

Control circuitry 118 can include one or more microprocessors such as a central processing unit(s) (CPU) and/or a graphical processing unit(s) (GPU). The control circuitry communicates with the RF layer 116 to transmit and receive radio frequency communications. During transmission, the control circuitry may provide a voice signal from a microphone or other data signal to the RF layer. The RF layer transmits the signal to a remote station, for example a fixed station operator or other cellular phones, etc. Transmissions to and from the RF layer can be conducted under control of the operating system. Communications received by the RF layer may be disseminated to applications via the operating system and vice versa. During a receiving mode, the RF layer receives a voice or other data signal from a remote station or other device which are processed appropriately. The control circuitry may include or further communicate with audio and video interfaces. An audio interface, for example may be used with a speaker to provide audible signals to a user and a microphone to receive audible signals from the user. Video interfaces may enable operation of onboard camera 120 to record still images, video streams and the like and further enable video for display 112.

Capture processor 140 enables the acquisition of images of a source of financial information to facilitate processing of a financial transaction using the source. In response to a request associated with a financial transaction received from one of applications 132, a set of images 150 including representations of a source 152 of financial information is acquired. Capture processor 140 may access camera 120 and/or another video or image interface to acquire images 150. In one example camera 120 captures video including source 152. In another example, camera 120 captures a set of still images including source 152.

The capture processor 140 performs at least a first set of image processing steps on the set of images 150. This first set of processing steps performs an analysis to determine whether the source 152 of the financial information is valid. One or more validation criteria can be used by the client device to determine whether an image includes a representation of a valid source of financial information. Validating the source in an image does not necessarily require character recognition, and thus, can be performed quickly in comparison to some processes. In one example, the physical characteristics of the source, such as its size and appearance are compared with valid sources of financial information. An image database 136 including known images of various types of sources may be maintained at the client device. The capture processor 140 may also utilize a standards database 134 including known standards such as aspect ratios and the like relating to various types of sources. By performing a preliminary analysis on the source itself, unnecessary transmission and processing of images and information from which it is improbable to complete an authorized transaction can be avoided.

If the source 152 of financial information is validated by the capture processor 140, a request to further process the financial transaction is transmitted from the client device 106 to validation server 102 over network(s) 108. The request includes at least one of the images that was validated as containing a viable source of financial information. The request may also include information related to the financial transaction for which the images 150 were captured. For example, the amount of the financial transaction and an identification of the payee receiving the transaction amount may be transmitted with the request. Further transactional metadata as described below may be sent as well.

In response to the request, the validation server 102 executes a second set of processing steps in order to validate the financial information indicated by source 152, and conditionally sends a request to source processor 104. Validation manager 160 receives the request and provides the validated image(s) to image processor 162. In one example, image processor 162 segments image 150 to identify and/or extract areas that contain financial information. From the identified areas, image processor 162 generates individual images. From a credit card image for example, processor 162 may generate images for each of the characters in the credit card number and the expiry.

The character images generated by processor 162 are passed to the character recognition engine 164, which applies a suitable optical or other character recognition process to identify the character associated with each character image. Engine 164 may utilize a database of source-based images in a database 168, such as those of characters found on typical credit cards and other sources of financial information, to determine a character for each character image and/or provide a character analysis.

Validation manager 160 performs one or more validation operations to determine whether the financial information indicated by the source is valid. In this context, validation does not refer to authenticating the financial information or authorizing a transaction using the financial information. Rather, validation refers to an initial determination of whether the financial information can be subjected to authentication or authorization. For example, manager 160 may analyze a character string from a credit card to determine whether the string is a possible credit card number. This may include determining whether the characters correspond to a character sequence for any known credit card type.

If the financial information is not determined to be valid, indicating that it cannot be authenticated or authorized, additional processing of the financial transaction can be avoided. In one example, the validation server returns a response to the client indicating that the financial information is not valid. The capture processor 140 can indicate to a user of the device or to an application 132 that the financial information is not valid. A user can be prompted to provide their source again if they believe that the message is in error so that additional images can be acquired for further processing to determine the financial information.

If the financial information indicated by the source is determined to be valid, validation manager 160 can issue a transaction request to source processor 104. The request may be to authorize the requested transaction or a request to both authorize and process the transaction. The source processor typically includes an authentication and authorization processor 172 that utilizes an account database 174 to authenticate accounts and authorize transactions. If the financial information and transaction are not authenticated and authorized, a response is returned to validation server 102, which returns a corresponding response to the client device 106. The response from the source processor and validation server may indicate that the financial information could not be authenticated or that the transaction could not be authorized. Source processor 104 is used broadly in the present context and includes card issuers, card processors, card aggregators, acquirers, third party processors, internet payment service providers (IPSP), independent sales organizations, and other parties that may be involved in processing financial transactions across computer networks.

If the request meets all the necessary criteria, source processor 104 authorizes and/or processes the transaction. A response is returned to validation server 102 which returns a response to client device 106 indicating that the transaction has been authorized and/or processed. Upon receipt of the response, capture processor 140 may provide an indication to the user or an application 132 indicating that the transaction has been authorized. In one example, capture processor 140 can provide a form to receive a signature from the user of the client device using display 112.

In one embodiment, validation server 102 returns the financial information to the client device 106 rather than issue a request to source processor 104. The client device 106 may then issue a request to source processor 104 or use the information in some other manner. For example, the information may be stored at the client device for future use or passed to an application 132 which can cause further processing such as by calling a third-party over network 108. In another embodiment, validation server 102 or client device 106 may process the financial transaction using the financial information.

In one embodiment, part or all of the processing distributed to validation server 102 can be implemented at client device 106. For example, an image processor 162 and character recognition engine 164 can be implemented at the client device. After determining that a source is valid, the source can be processed to determine the financial information using image processing and character recognition. The financial information can be validated at the client device and if determined to be valid, a transaction request can be issued directly to the source processor from the client device. In another example, the client device may determine the financial information from the source then forward the information to the validation server 102 for validation. One or more validated images of the source can be sent with the financial information from the source.

In one embodiment, client device 106 also includes a source manager 142 and database 144 of pre-acquired financial information from one or more physical sources. Each record 146 in database 144 corresponds to a physical source of information and contains financial information previously acquired from the source. The pre-acquired information may be obtained using image-processing as described herein, or from manual entry by a user using an interface provided by manager 142 for example. Source manager 142 accesses the records in database 144 to complete financial transactions in response to user requests. For example, an application 132 may call source manager 142 to retrieve and authenticate financial information for a transaction requested by the user. Source manager 142 acquires one or more images of the corresponding source using camera 120. The images and/or financial information acquired from the images can be compared to the pre-acquired information and/or images to authenticate the source. If the images and/or information match, the manager authenticates the source and allows the transaction to proceed, for example by issuing a request to validation server 102 or source processor 104. As more fully described hereinafter, validation of the source for pre-acquired records 146 can be performed at validation server 102 in one embodiment.

Figure 2:
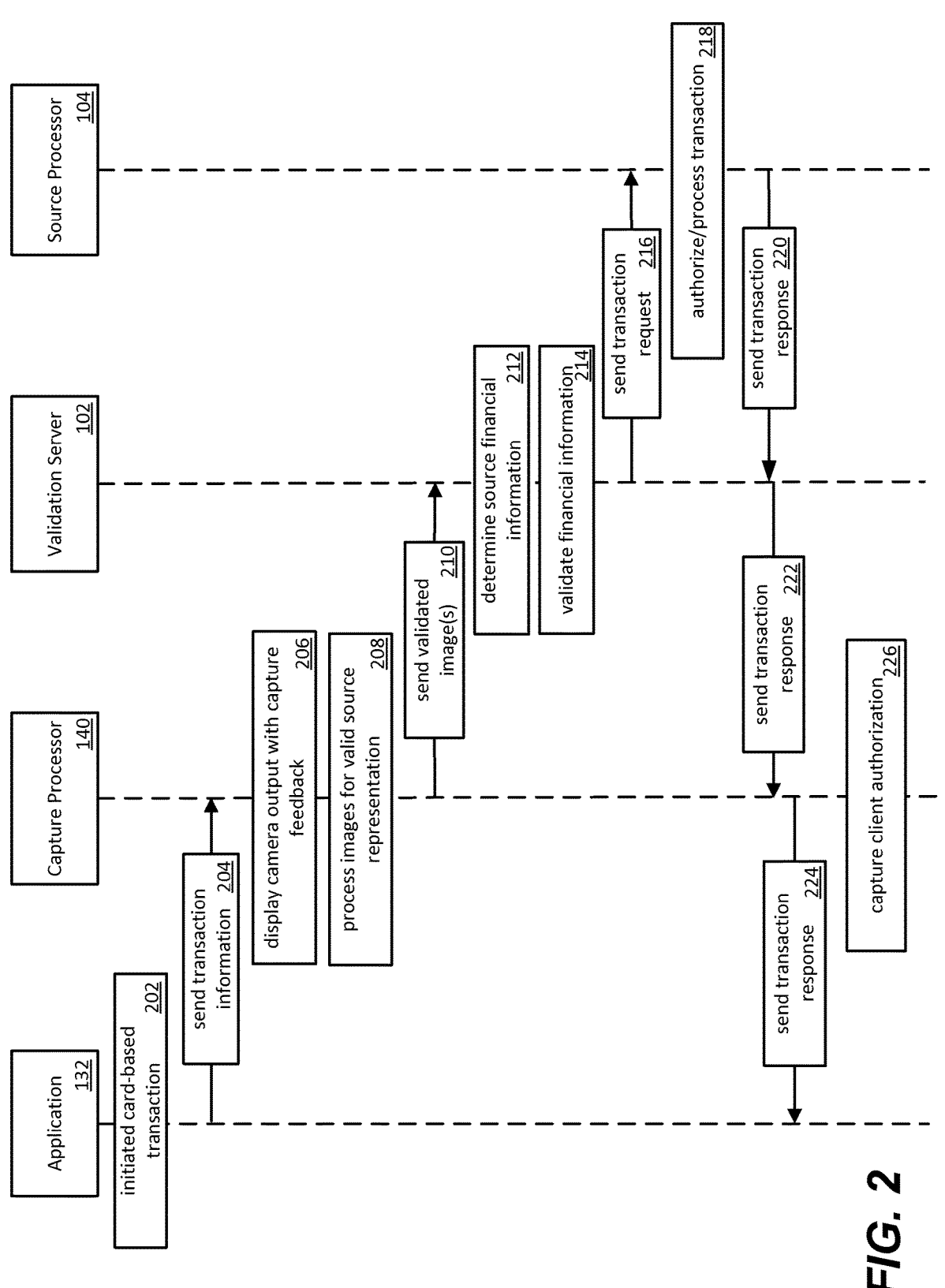
FIG. 2 is diagram depicting a processing sequence for a financial transaction according to one embodiment.

FIG. 2 is a diagram depicting a distributed processing sequence for a financial transaction using image-based processing in accordance with one embodiment. FIG. 2 depicts communication and processing between an application 132, capture processor 140, validation server 102 and source processor 104. Although an exemplary credit card-based transaction may be described, the disclosed operations are equally applicable to the capture of other sources of financial information such as checks and the like.

A credit card-based transaction is initiated at step 202. In FIG. 2, the transaction is initiated by an application executing on client device 106. Transactions may be initiated by any type of application where purchases using physical sources of financial information are utilized. By way of non-limiting example, games, internet browsers, utilities, tools, and the like are all well known in some instances to be enabled to facilitate transactions between users of the application and the provider of the application or a third party. Consider a user utilizing a web browser to add items to a virtual shopping cart at an online retailer offering goods or services for purchase. A financial transaction may be initiated to complete the purchase of the goods or services. The retailer may offer the user the option of providing payment using credit card information. In accordance with one embodiment, an option to capture the credit card information using image-based processing can be provided. In one example, a software development kit (SDK) is provided so that any number and type of applications 132 can seamlessly interface with the capture processor to provide image capture and processing for source-based financial transactions.

Figures 3, 4, 5, 6:
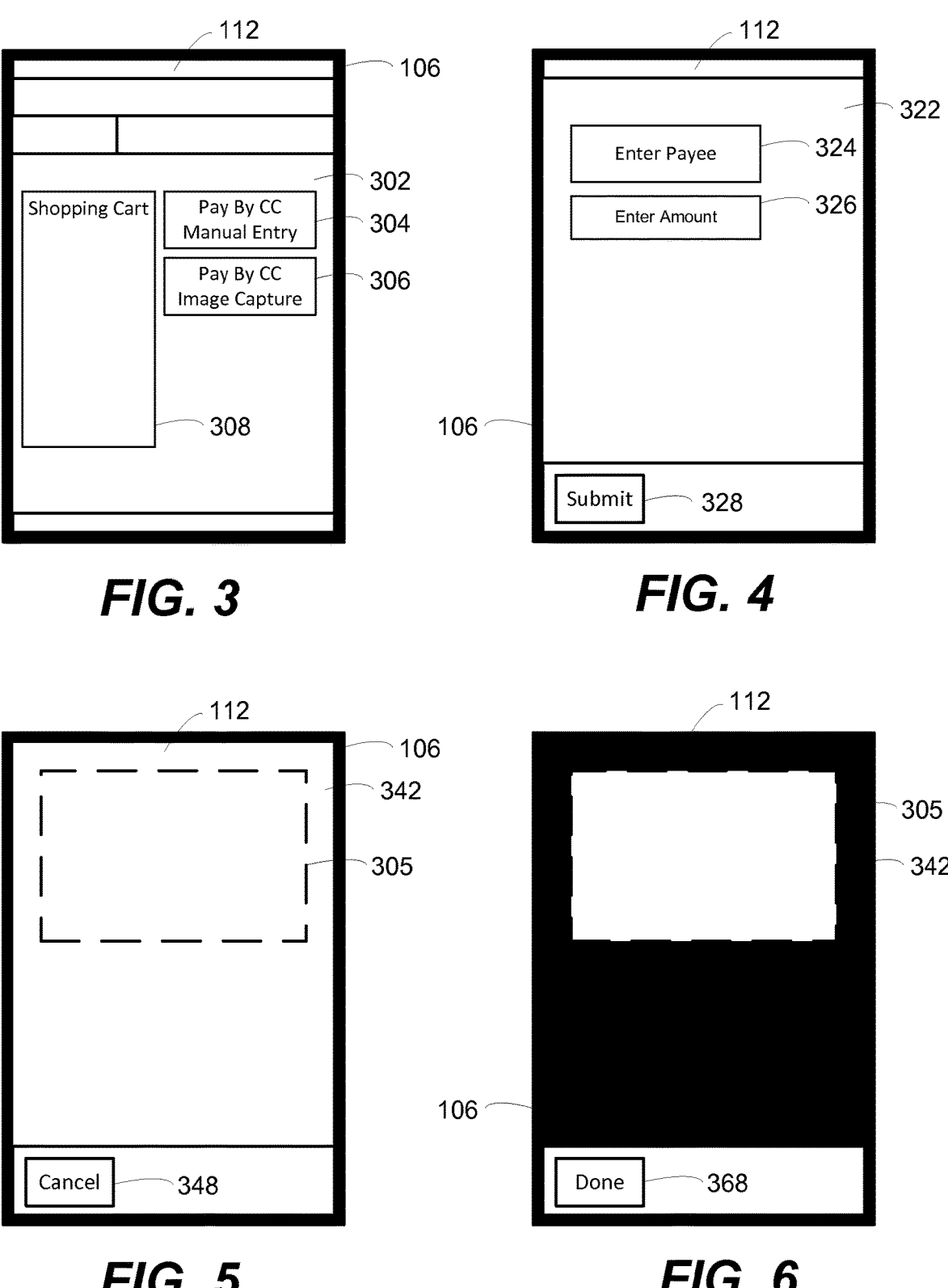
FIG. 3 is a block diagram of a client device and a graphical user interface for initiating an image-based transaction from a third party application in one embodiment.
FIG. 4 is a block diagram of a client device and a graphical user interface for initiating an image-based transaction from a capture application of one embodiment.
FIG. 5 is a block diagram of a client device and a graphical user interface for acquiring one or more images of a source of financial information in accordance with one embodiment.
FIG. 6 is a block diagram of the client device and graphical user interface of FIG. 5 when one or more validated images have been acquired.

FIG. 3 is a block diagram depicting client device 106 and a graphical user interface (GUI) that may be provided to initiate a credit card transaction using an internet browser application for example. GUI 302 includes a shopping cart 308 having a list of items that the user has added for purchase. An option to make payment using a credit card and to enter the credit card information manually is provided by button 304. In response to selection of button 304 by the user, the application may provide a form-based page for the user to type or otherwise enter the credit card information. An option to make payment using a credit card and to automatically capture the credit card information using image-based capture is provided by button 306.

In an embodiment as shown in FIG. 4, a standalone application 132 may also be provided to capture source financial information. In this example, GUI 322 is provided with input fields 324 and 326 to allow the user to enter an amount of the transaction and a payee for the transaction. After entering the information in fields 324 and 326, the user can select submit button 328 to capture the credit card information using image-based processing. The payor and their account information for the transaction can be obtained in the image acquisition process.

Returning to FIG. 2, if button 306 (FIG. 3) or 328 (FIG. 4) is selected, application 132 sends the transaction information to capture processor 140 at step 204. In response, capture processor 140 accesses camera 120 so that a set of images including representations of the source of financial information can be captured. At step 206, capture processor 140 renders the output of camera 120 on display 112 so that a user of client device 106 is provided feedback on the capture of source 152.

FIG. 5 is a block diagram depicting client device 106 and a GUI 342 provided by capture processor 140 when capturing images from camera 120 in one example. The output of camera 120 is displayed on display 112 with a capture overlay box 305. The capture overlay box includes dimensions corresponding to the aspect ratio of a credit card. The user may position their credit card within view of camera 120 and use overlay box 305 to properly position the card and determine when the information has been captured. In one embodiment, the overlay box provides color-coded feedback indicating alignment of the card within view of the camera. For example, each line of the bounding box may be provided in a first color when no corresponding edge of the credit card has been detected and provided in a second color when the corresponding edge of the credit card is detected. Further, when one or more validated images have been captured, the bounding box and/or other portion of the rendered display can provide an additional output to the user that the credit card has been validated.

At step 208, the images from camera 120 are processed by capture processor 140 until one or more images containing a validated credit card are detected. Step 208 can include processing the images until a representation of the credit card within the images is determined to meet one or more predefined criteria for a valid source of financial information. Criteria at step 208 can include, but are not limited to, determining whether the representation of source 152 meets a predefined aspect ratio for a credit card, such as may be defined in standard specified by the International Organization for Standardization (ISO). The criteria can additionally, or alternatively, include criteria for representations included on the front or back portion of the credit card 152. For example, a requirement that the card contain a representation of a logo associated with one or more of a card processor, card issuer, or card aggregator, etc. can be used. Additional criteria can include determining whether the card includes a background image associated with any one of the above. In another example, step 208 can include determining whether the card includes a representation of a sequence of numbers such as may be associated with a credit card number and/or expiry.

FIG. 6 is a block diagram depicting client device 106 and GUI 342 provided by capture processor 140 when one or more validated images from camera 120 have been captured. Any portions of the output of camera 120 outside of bounding box 305 are no longer rendered on display 112. In this example, those portions of the display are rendered black. One or more validated images of the credit card are statically displayed within bounding box 305 to indicate to the user that a suitable image of the credit card has been processed.

When the one or more valid card images are detected, the capture processor 140 sends a request to validation server 102 at step 210. The request passed at step 210 includes at least one validated card image. The request can include additional images, such as of the back of the card or additional images of the front of the card, to further facilitate processing by validation server 102. The request at step 210 can also include transaction information such as an identification of the payee and amount of the transaction. Any other information such as financial information associated with credit card 152 that may be determined by capture processor 140 can be included as well.

At step 212, the validation server receives the validated card image(s) and begins processing to determine the financial information associated with source 152. Step 212 can include image-based processing and/or optical character recognition processing. In one example, image processor 162 accesses the one or more images and performs segmentation to identify relevant portions including representations of the financial information within source 152. Such image processing can include using predefined characteristics of various sources 152 to determine whether the representation of source 152 includes these characteristics.

Once the relevant characteristics are identified and the extracted portions obtained, character recognition engine 164 can analyze the images to determine individual characters in the financial information, such as the credit card number and/or expiry. At step 214, the validation manager determines whether the financial information determined by engine 164 is valid. In one embodiment, step 214 includes an initial validity check that determines whether the financial information is subject to authentication and/or authorization. In this respect, step 214 only determines whether the financial information can be authenticated and/or authorized, not whether the information is actually authentic and/or authorized.

If the financial information is validated, a transaction request is sent from the validation server 102 to source processor 104 at step 216. The transaction request at step 216 is a traditional credit card authorization and/or processing request in one example. The amount, payee, and financial information of the payor's account as determined from source 152 is passed to the source processor with a request to authorize and/or process the transaction. At step 218, the source processor authorizes and/or processes the transaction. The source processor will first authenticate the financial information to determine if it indicates an authentic credit card account. If the financial information is authentic, the processor will determine whether the account is authorized for the transaction. Source processor 104 may fully process the transaction at step 218 in one example or only authorize the transaction.

A reply is passed back to the validation server at step 220. If the processor is unable to authenticate the financial information, a suitable reply is sent at step 220 indicating that the account is not valid. If the account is not authorized for the transaction, the reply at step 220 may decline the transaction. Finally, if the account is authenticated and authorized for the transaction, the card processor provides a reply indicating that the transaction is authorized and/or has been processed.

Validation server 102 receives the response at step 220 and provides a corresponding response to the client device at step 222. Capture processor 140 then responds to application 132 indicating the status of the transaction request at step 224. In one example, the capture processor 140 displays a client authorization screen at step 226. At step 226, the capture processor may receive a signature from the user of the client device, indicating their authorization of the transaction. This information can be sent to validation server 102 in one example. Step 224 is optional. In one example, if the credit card is authorized for the transaction and the transaction is processed a simple indication can be provided to the user that the transaction has completed.

Figure 7:
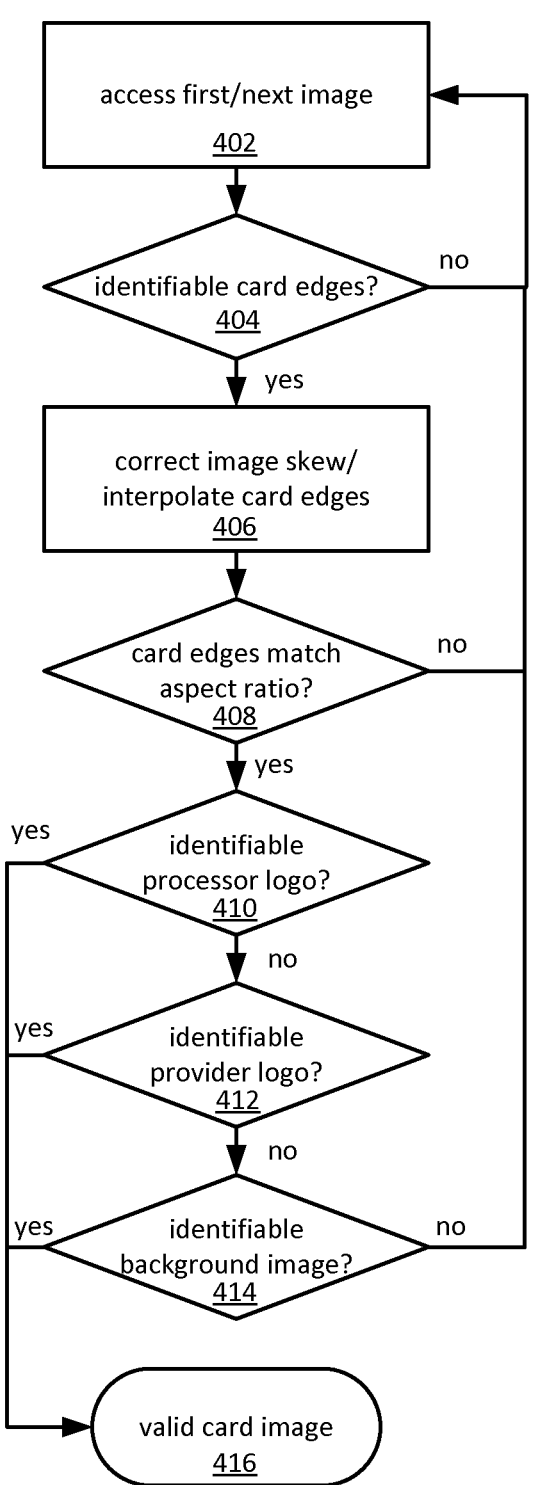
FIG. 7 is a flowchart describing a method of processing a set of images to a detect a valid source of financial information in accordance with one embodiment.

FIG. 7 is a flowchart describing a method of processing a set of images to detect a valid source of financial information as can be performed at step 208 of FIG. 2 in one embodiment. At step 402, a first image from a set of images is accessed by the capture processor 140 at client device 106. Each image includes at least a partial representation of a source of financial information. For example, the image may depict a credit card having an account number and expiration date or a check having an account number and routing number. The images accessed at step 402 may also include representations of another portion of the source, such as of the back of a credit card. In one example, step 402 is performed simultaneously while acquiring additional images in the set. A video stream or multiple image captures from the camera can be accessed to acquire the set of images.

At step 404, image processing is applied to determine whether there are identifiable card edges in the selected image. For example, credit cards are generally rectangular in shape, having two sets of two opposing parallel edges. Step 404 can include analyzing each image to determine whether there are identifiable card edges. As with the other steps described herein, step 404 can include providing feedback such as a visual indicator of whether the card edges have been identified. As described in FIG. 5 for example, a bounding box overlay can indicate whether the card edges have been detected. In one embodiment, capture processor 140 identifies contrasts in the scene(s) depicted by images 150. In this manner, the contrast between the credit card and one or more backgrounds may be identified as corresponding card edges. If no identifiable card edges are found within an image the process returns to step 402 to access or acquire another image including at least a partial depiction of the source.

If the card edges are identified, the capture processor corrects any image skew and interpolates the card edges at step 406. For example, if a source of financial information is not presented with its front or back surface in a plane parallel with that of the front of the camera, techniques to correct this skew and determine the proportional dimensions of each identified card edge are applied. The card edges can be interpolated to account for rounded edges so as to form a rectangular box from the card edges detected and identified at step 404.

Once any image skew is corrected and the card edges are interpolated, the capture processor determines whether the dimensions of the card edges match any known aspect ratios for sources of financial information at step 408. In one example, capture processor 140 can compare the length of the card edges or the ratio of the length of the card edges to a known aspect ratio provided by an ISO standard. The aspect ratios of known standards for sources of financial information are maintained in database 134 in one embodiment. If the card edges do not match any known aspect ratios, the capture processor accesses another image at step 402.

If the edges match a pre-defined aspect ratio, capture processor 140 determines whether the representation of the card includes an identifiable logo associated with a card processor at step 410. Capture processor 140 can access image database 136 including a set of representations or information corresponding to the logos of known processors of credit cards. For example, the logo of Visa, Inc., Mastercard Incorporated and other entities or corporations that are included on many credit cards can be provided in image database 136. Capture processor 140 can compare the representation of the credit card in the image to the logos in database 136 to determine whether the card contains a logo of a known card issuer. In one embodiment, the capture processor extracts one or more portions of the representation of the credit card for comparison to the logos in database 136. For example, the capture processor may extract portions of the representation corresponding to known locations of processor logos included on credit cards.

If a processor logo is identified in the image, the capture processor determines that the card image represents a valid source of financial information at step 416. In one embodiment, processing continues at step 210 of FIG. 2 after validating a single image. In another embodiment, additional images are processed until a set of two or another number of validated images are obtained.

If the representation does not include an identifiable processor logo, the method continues at step 412 to determine whether the representation includes an identifiable provider logo such as may be associated with a bank or other provider of credit cards. Logos of known providers of credit cards can also be stored in image database 136. If no identifiable provider logo is determined at step 412, the capture processor determines at step 414 whether an identifiable background image is present on the representation of the source. Credit cards often include background images including pictures, graphics, photographs, etc. These background images can be stored in image database 136. At step 414, the capture processor compares these background images to any background image included on source 152. If there is no identifiable background image, the method returns to step 402 to access the next image in the set or to acquire additional images with representations of the financial information source. In one example, processing according to FIG. 7 can proceed until a user cancels the source acquisition process, such as by selecting the "cancel" button 348 shown in FIG. 5.

FIG. 7 validates a card representation when it is determined to meet a pre-defined aspect ratio and contain any one of a processor logo, provider logo or background image. Other examples may require that each of the above requirements be met or any combination thereof. In another example, the aspect ratio or a logo alone may be used to validate a source. Further requirements may also be included for validation.

FIG. 8 is a flowchart describing one embodiment of a method for sending a request from a client device 106 to a validation server 102 for validation of the financial information of a source. In one example, the method depicted in FIG. 8 can be performed by capture processor 140 at client device 106 as shown in step 210 of FIG. 2. At step 450, the capture processor analyzes the set of validated images to access one or more images having better representations of the source of financial information. Step 450 may include analyzing the images to detect the clearest representation of the source of financial information. Multiple images may be selected at step 450 for editing and/or transmission to the validation server in one embodiment. For example, an image of the front and back of a credit card may be selected and sent to the validation server in one example. Further, more than one image of either the front and back of the card can be sent to provide the validation server with more than one image to extract financial information.

At step 452, an area or portion of the selected image(s) within an identified boundary is clipped or extracted from the image being transmitted to the validation server. Step 452 can include identifying portions of the representation having a known correspondence to relevant portions of the source. For example, a portion of the representation corresponding to a lower third of a credit card may be identified and extracted for the credit card number and/or expiry. Similar techniques can be applied to extract portions of the image corresponding to a CCV number on the back of a credit card. In another example, step 452 can include clipping the entire representation of the source of financial information. For example, any portion of the image within bounding overlay box 305 of FIG. 5 can be extracted. Step 452 is optional and in one embodiment, the entire image(s) is sent to the validation server.

At step 454, any transactional metadata associated with the financial transaction is determined. The transactional metadata at step 454 can include information associated with the financial transaction in addition to traditional transaction information such as payee, payor, and amount. For example, the transaction metadata may include an identification of the application initiating the transaction, positioning information identifying a location of the device at the time of initiating the transaction, etc. At step 456, the client device sends the validated card image(s), the transaction information and/or the transactional metadata to card processor 104.

FIG. 9 is a flowchart describing a method for determining financial information from one or more validated card images, as may be performed by validation server at step 212 of FIG. 2 in one embodiment. At step 502, the image processor 162 at validation server 102 accesses the image(s) included in the request from the client device.

The image processor performs vertical segmentation of the image(s) at step 504. Vertical segmentation can be applied to identify one or more areas of the representation of the source associated with pre-defined characteristics of known sources of financial information. For example, step 504 can include vertically segmenting the images to identify vertically-defined regions associated with the credit card number on a credit card as well as or in addition to the expiration date on the credit card. In one example, vertical segmentation vertically scans an image to identify areas of noise indicating a change in representation. Areas of high noise may indicate regions corresponding to the credit card number, expiry and/or cardholder's name. Further, the location and size of some information is constant across sources, such as a credit card number and expiration date. Vertical segmentation can identify these areas based on pre-determined characteristics that identify these areas. Based on the vertical segmentation, an account number location is identified at step 506 and an expiry location is identified at step 508. Additional locations corresponding to name, CCV, etc. may also be identified.

At step 510, the image processing module performs horizontal segmentation on the locations identified at steps 506 and 508. In one example, the horizontal segmentation identifies individual noisy regions to locate the individual characters within the credit card and expiry location. The horizontal segmentation may also identify individual character regions based on pre-defined characteristics associated with known sources. For instance, the horizontal segmentation may identify portions of the image corresponding to four characters and a space, followed by four characters and a space, followed by four characters and a space, followed by four characters and a space. The individual characters can be extracted as images corresponding to the credit card number. The image processor may identify known punctuation such as dashes and slashes as delineating a known number of characters in an expiry.

At steps 512 and 514, the processing module generates an image for each identified character location in the credit card number location and each identified character location in the expiry location. In one example, steps 512 and 514 include extracting those portions of the credit card number and expiry location corresponding to individual characters in the character strings. After generating an image for each character, the individual images are subjected to optical character recognition at step 516. In one embodiment, character recognition engine 164 may utilize a database of images, such as those of characters found on typical credit cards and other sources of financial information, to determine a character for each character image. In one example, multiple optical character recognition algorithms are applied. Each algorithm can provide a score or rating for each recognized character corresponding to a confidence that the character is correct. The validation manager can select the result of the algorithm that provides the highest score or rating in one example.

Figure 10:
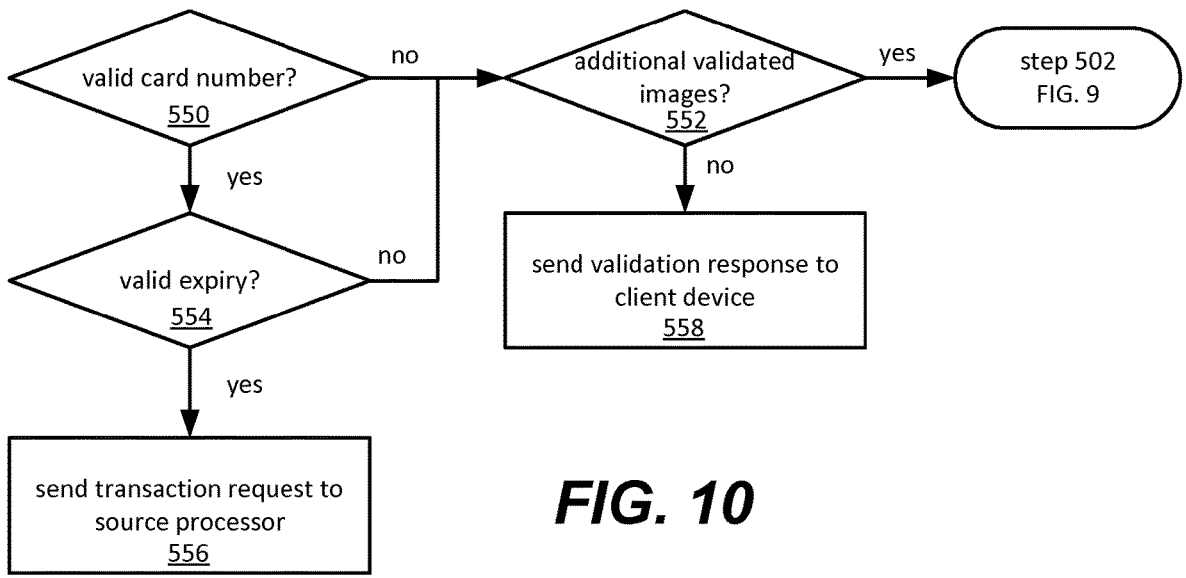
FIG. 10 is a flowchart describing a method for validating financial information in one embodiment.

FIG. 10 is a flowchart describing a method for performing a validity analysis on the financial information as can be performed at step 214 of FIG. 2. In one embodiment, the method of FIG. 10 is performed by validation module 166 at validation server 102. At step 550, the validation manager accesses the results of the character recognition from step 516 of FIG. 9, and performs one or more validation operations to determine whether the financial information indicated by the source is valid. Step 550 does not authenticate the credit card number but rather, determines whether the credit card number meets objective criteria indicating it to be a credit card number. In this context, validation does not refer to authenticating the financial information or authorizing a transaction using the financial information. Rather, validation refers to an initial determination of whether the financial information can be subjected to authentication or authorization.

In one example, manager 160 may analyze a character string from a credit card to determine whether the string is a possible credit card number. This may include determining whether the number of characters corresponds to a number of characters for any known credit card type. Further, this may include applying one or more algorithms to the characters to determine whether they meet a set of predefined criteria. For example, card numbers provided by card issuers may be established such that one or more algorithms can be applied to determine whether the number is a possible number utilized by the card issuer. Likewise, the validation processor can determine whether the expiry is a valid expiry corresponding to a valid card number. For an expiry, the validation manager may determine whether the string of characters is in a known format for representing dates, for example.

In one example, the Luhn algorithm is applied to determine whether the recognized number is a potential credit card number. The Luhn algorithm is applied to the determined credit card number and the result indicates whether the number is a potentially authentic credit card number.

If the number is not representative of a valid credit card number, the method proceeds at 552 to determine whether additional validated images are present. If there are additional validated images, processing can continue at step 502 of FIG. 9 by accessing another validated image to determine the credit card number. If there are no additional images, a response indicating that the financial information is not valid is sent to the client device at step 558. If the card number is a valid card number, the validation module determines whether the expiration date is valid at step 554. In one example, step 554 examines the expiry character string to identify any known format for expressing a date such as: month/year; month/day/year; day/month/year; etc. If the format does not match any known formats for depicting a date, the method continues at step 552 by determining whether there are any additional validated images. If the expiration date is determined to be a potentially valid expiration date, the method continues at step 556 by issuing a transaction request to the source processor.

Figure 11:
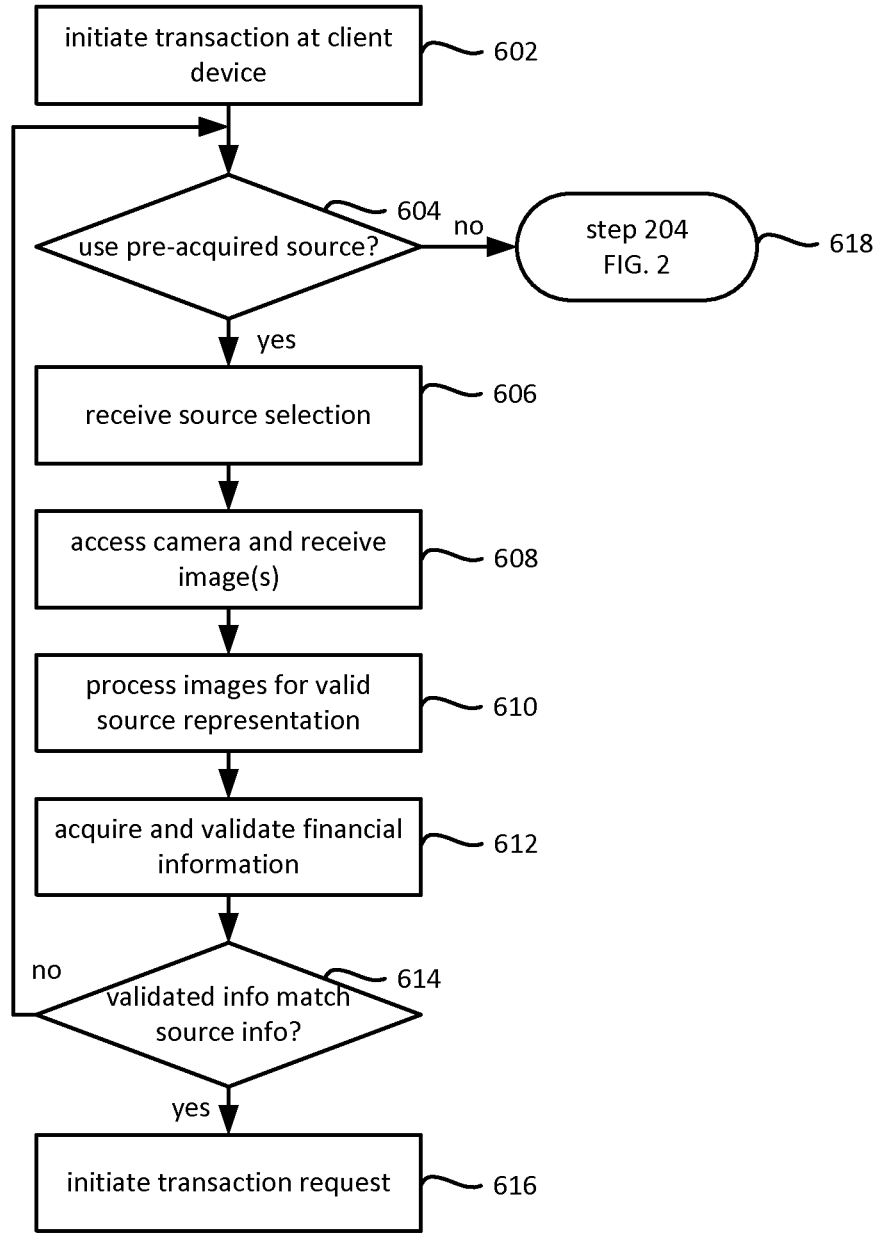
FIG. 11 is a flowchart describing a method of image-based processing to authenticate previously acquired financial information from a source.

FIG. 11 is a flowchart describing a method in accordance with one embodiment that uses image-based processing of a source of financial information to authenticate previously acquired financial information from the source. In this manner, it can be verified that the party initiating the transaction at the client device possesses the physical source. Such verification may meet qualifications set by card processors to reduce fees for processing transactions, such as by meeting the requirements for a card-present transaction where the card is physically present at the time of initiating a transaction.

At step 602, a financial transaction is initiated at a client device 106. The transaction may be initiated by a stand-alone application for acquiring and/or processing transactions or from within another application such as an internet browser or mobile phone application from which transactions may be made. At step 604, the application determines whether the user wishes to complete the transaction using pre-acquired financial information stored at the client device. The application may provide an interface from which the user may select a method of payment for the transaction. In another embodiment, step 604 may be performed by source manager 142, for example in response to a call or request from the application initiating the transaction. If the user indicates that they do not wish to use pre-acquired financial information, the method continues at step 204 of FIG. 2 by sending the transaction to the capture processor to begin the source acquisition process.

If the user indicates that they wish to use pre-acquired financial information, the method continues at step 606 where a selection of one of the pre-acquired sources is received from the user. In one embodiment, source manager 142 provides an interface at step 606 listing the available sources and providing an option to select one of the sources.

After receiving a selection of one of the sources, manager 142 accesses camera 120 and acquires one or more images including a representation of the physical source corresponding to the selection at step 608. In one embodiment, an interface can be provided with instructions to the user to position the source for capture by the camera. After or as the images are being acquired, the source manager processes the images to authenticate the source. At step 610, the images are processed to determine whether they contain a representation of a valid source of financial information. In one embodiment, step 610 is performed as described in FIG. 7. The source manager 142 then uses one or more of the validated images to acquire and validate the financial information at step 612. In one embodiment, step 612 is performed using the method of FIG. 9 to acquire the financial information and the method of FIG. 10 to validate the financial information.

If the source manager validates the financial information for the source, the information is compared to the pre-acquired information that is stored at the client device for the source at step 614. The comparison can be of the account numbers, expiries, names, provider, processor, etc. or any combinations of these items. If the information does not match, the method continues at step 604 to determine how the transaction should proceed. Another attempt to acquire and validate the financial information can be made or the user may elect to utilize a different form of payment.

If the newly acquired financial information matches that stored at the client device, a transaction request is initiated at step 616. In one embodiment, the client device can issue a transaction request directly to one or more source processors 104 at step 616. In another embodiment, the client device may issue a request to a validation server which can issue the transaction request to the card processor.

In the method of FIG. 11, the pre-acquired information is validated using financial information acquired from the images of the source. In another embodiment, the client device can validate the pre-acquired information based on one or more of the acquired images without acquiring the financial information from the image. For example, the client device may store pre-acquired images of the source along with the pre-acquired financial information. Step 612 can be omitted and at step 614 a comparison between the pre-acquired image and one or more of the images received at step 608 can be made. If the images match, the pre-acquired information can be authenticated and the transaction initiated at step 616.

In another example, client device 106 may forward one or more validated images to validation server after processing the images at step 610. The validation server may acquire the financial information and forward it back to the client device for validation at step 614. Alternatively, the validation processor may maintain the pre-acquired financial information from the source and perform the validation at step 614. If the information is authenticated based on the newly acquired image(s), the validation server may initiate the transaction, for example by issuing a request for authorization to the source processor. The validation server may also return a response to the client device. If the response indicates that the pre-acquired information has been authenticated, the client device can issue the transaction request to the source processor.

Figure 12:
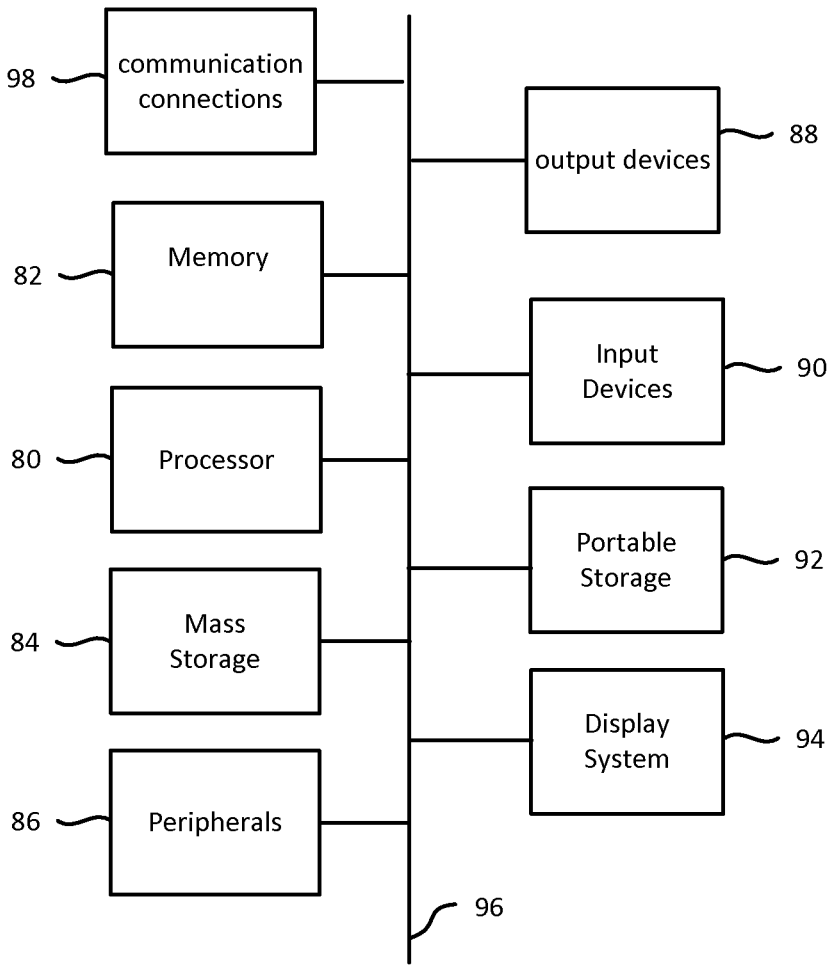
FIG. 12 is a high level block diagram of a computing system that can be used to implement one or more embodiments of the present disclosure.

FIG. 12 is a high level block diagram of a computing system which can be used to implement any of the computing devices of FIGS. 1 and 2 such as client device 106, validation server 102 and source processor 104. The computing system of FIG. 12 includes processor 80, memory 82, mass storage device 84, peripherals 86, output devices 88, input devices 90, portable storage 92, and display system 94. For purposes of simplicity, the components shown in FIG. 12 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Processor 80 may include one or more central processing units and/or one or more graphical processing units. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system of FIG. 12 will (optionally) have an output display system 94, which may include a video card and monitor. Output devices 88 can include speakers, printers, network interfaces, etc. The system may also contain communications connection(s) 98 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 12 are those typically found in computing systems suitable for use with the technology described herein, and are intended to represent a broad category of such computer components that are well known in the art. Many different bus configurations, network platforms, operating systems can be used. The technology described herein is not limited to any particular computing system.

The technology described herein can be implemented using hardware, software, or a combination of both hardware and software. The software may be stored on one or more processor readable storage devices as described above (e.g., memory 82, mass storage 84 or portable storage 92) having processor readable code embodied thereon for programming one or more processors to perform the processes described herein. The processor readable storage devices can include non-transitory, tangible computer readable media such as volatile and non-volatile media, removable and non-removable media. Tangible computer readable media may be implemented in any method or technology for storage of information such as computer readable instructions, data structures, program modules or other data. Examples of tangible computer readable media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other non-transitory, tangible medium which can be used to store the desired information and which can be accessed by a computer. In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more tangible computer readable media/storage devices, peripherals and/or communication interfaces.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A system comprising:

one or more processors; and one or more machine-readable storage media having instructions stored thereon that, in response to being executed by the one or more processors, cause the system to:

responsive to receiving a first electronic image of a payment instrument for processing a first electronic transaction, detect that the first electronic image contains an object having financial information that corresponds to the payment instrument;

adjust an image skew of the payment instrument in the first electronic image using a correction technique;

detect one or more edges of the payment instrument in the first electronic image based on an image processing of the first electronic image and the adjusted image skew of the payment instrument;

segment the first electronic image into segments based on the one or more edges detected and image noise in the first electronic image;

extract, using an image extraction process on each area in the first electronic image, portions of the financial information corresponding to the payment instrument from each of the segments, wherein the image extraction process uses a plurality of scores obtained from a plurality of optical character recognition algorithms, and wherein the portions of the financial information are extracted from one or more text characters associated with each of the portions based on the plurality of scores;

verify an authenticity of the financial information based on at least the first electronic image, the extracted portions, and whether the one or more edges are associated with a known aspect ratio associated with the payment instrument; and process the first electronic transaction using the financial information and based on verifying the authenticity.

2. The system of claim 1, wherein executing the instructions further causes the system to:

compare a received second electronic image indicating a capture of the payment instrument for a second electronic transaction with the first electronic image; and determine, based on comparing the second electronic image with the first electronic image, that the payment instrument is unable to be identified in the capture of the second electronic image.

3. The system of claim 2, wherein comparing the second electronic image with the first electronic image is performed without performing the image extraction process on purported financial information in the second electronic image.

4. The system of claim 1, wherein the detecting the none or more edges comprises:

identifying two of the one or more edges of the payment instrument in the first electronic image; and matching parallel ones of the two of the one or more edges that form a rectangular card shape.

5. The system of claim 1, wherein determining that the first electronic image contains the object that corresponds to the payment instrument includes determining that the object in the first electronic image includes a background image that matches a stored background image.

6. The system of claim 1, wherein extracting the portions of the financial information includes:

determining the plurality of scores associated with each of the portions, wherein each score of the plurality of scores corresponds to a different one of the plurality of optical character recognition algorithms used for extracting the portions; and assigning the one or more text characters to each of the portions based on the plurality of scores.

7. A non-transitory machine-readable medium having stored thereon machine-readable instructions executable to cause a machine to perform operations comprising:

receiving an image indicating a capture of a source of funding information;

adjusting an image skew of the source of the funding information in the image using a correction technique;

detecting one or more edges of the source of the funding information in the image based on an image processing of the image and the adjusted image skew of the source of the funding information;

detecting that the image includes the source of the funding information based on the one or more edges;

segmenting the image into segments based on the one or more edges detected and image noise detected in the image;

determining portions of the funding information corresponding to the source from one or more of the segments;

extracting the funding information from the portions based on a plurality of scores obtained from a plurality of optical character recognition algorithms, and wherein the funding information is extracted from one or more text characters associated with each of the portions based on the plurality of scores; and verifying an authenticity of the extracted funding information based on at least the image and one or more portions of the extracted funding information.

8. The non-transitory machine-readable medium of claim 7, wherein the detecting that the image includes the source comprises:

detecting edges within an overlay box used to capture at least a portion of the image;

computing an aspect ratio for the edges; and determining, based on a comparison of the aspect ratio for the detected edges of the image with stored image information, that the image contains an object that corresponds to the source of the funding information.

9. The non-transitory machine-readable medium of claim 8, wherein the detecting the edges comprises identifying parallel ones of the edges that form a rectangular card shape within the overlay box.

10. The non-transitory machine-readable medium of claim 7, wherein, prior to the extracting the funding information, the operations further comprise:

identifying areas of the image noise in the image, wherein each area of the image noise indicates a potential character of the funding information, and wherein the different segments correspond to the areas of the image noise.

11. The non-transitory machine-readable medium of claim 7, wherein the portions of the funding information correspond to the image noise in each of the segments, and wherein the extracting is performed on each of the segments in a sequential order based on locations of the segments in the image.

12. The non-transitory machine-readable medium of claim 7, wherein, prior to the verifying, the operations further comprise:

sequentially ordering the extracted funding information based on the portions, wherein the sequentially ordering recreates the funding information from the image.

13. The non-transitory machine-readable medium of claim 7, wherein the portions are determined based on image data of the image indicating at least one character present in each corresponding one of the segments, and wherein the extracting the funding information comprises performing at least one of the plurality of optical character recognition algorithms on each of the portions of the funding information from the image to identify the at least one character in the image.

14. A method comprising:

receiving an image of a payment instrument provided for processing an electronic transaction;

adjusting an image skew of the payment instrument in the image using a correction technique;

detecting one or more edges of the payment instrument in the image based on an image processing of the image and the corrected image skew of the payment instrument;

analyzing the image for an object that corresponds to the payment instrument;

segmenting the image into segments based on the one or more edges detected and image noise in the image;

extracting, using an optical character recognition on one or more areas of the image corresponding to the segments, data from portions of the image corresponding to the payment instrument, wherein the extracting is based on a plurality of scores obtained from a plurality of optical character recognition algorithms corresponding to the optical character recognition, and wherein the data is extracted from one or more text characters associated with each of the portions based on the plurality of scores;

sequentially ordering the data extracted from the portions of the image based on placements of the one or more areas in the image;

verifying an authenticity of the extracted and sequentially ordered data; and processing the electronic transaction using the extracted and sequentially ordered data based on the verifying the authenticity.

15. The method of claim 14, wherein the analyzing the image for the object comprises:

detecting the one or more edges are contained within an overlay box used to capture at least a portion of the image;

computing an aspect ratio for the one or more edges using at least the overlay box; and determining, based on a comparison of the aspect ratio for the one or more edges of the image with stored image information, that the image contains the object that corresponds to the payment instrument.

16. The method of claim 15, wherein the detecting the one or more edges comprises identifying parallel ones of at least two of the one or more edges that form a rectangular card shape within the overlay box.

17. The method of claim 14, wherein, prior to the extracting the data, the method further comprises:

identifying areas of the image noise in the image, wherein each area of the image noise indicates a potential character of the one or more text characters of the payment instrument.

18. The method of claim 17, wherein the portions of the image corresponding to the payment instrument correspond to the image noise in each of the segments.

19. The method of claim 14, wherein the sequentially ordering recreates payment instrument information found on the payment instrument captured in the image.

20. The method of claim 14, wherein the portions are determined based on the image noise indicating the one or more text characters are present in each corresponding one of the segments, and wherein the extracting the data comprises performing the optical character recognition on each of the segments sequentially based on a location of each of the segments in the image.

* * * * *